United States Patent [19]

Kaiser et al.

[11] 3,801,250

[45] Apr. 2, 1974

[54] APPARATUS FOR EXERTING CONTINUOUS PRESSURE

[75] Inventors: Walter Kaiser; Rolf Gersbeck, both of Hannover, Germany

[73] Assignee: Hermann Berstorff Maschinenbau GmbH, Hannover-Kleefeld, Germany

[22] Filed: Apr. 11, 1972

[21] Appl. No.: 242,935

[30] Foreign Application Priority Data
Apr. 23, 1971  Germany............................ 2120016

[52] U.S. Cl............. 425/224, 100/93 RP, 100/153, 425/371
[51] Int. Cl........................... B29d 7/14, B30b 5/04
[58] Field of Search ........... 100/151, 152, 153, 154, 100/93 RP; 425/371, 335, 363, 224; 162/358

[56] References Cited
UNITED STATES PATENTS

| | | | |
|---|---|---|---|
| 502,523 | 8/1893 | Lockstaedt ..................... | 100/120 X |
| 2,069,589 | 2/1937 | Meijling et al. ..................... | 425/371 |
| 2,562,358 | 7/1951 | Huebner .......................... | 425/174.4 |
| 2,891,279 | 6/1959 | Neumann......................... | 425/371 |
| 3,422,172 | 1/1969 | Dekker......................... | 425/174.4 X |
| 3,621,524 | 11/1971 | Sherwood ......................... | 425/371 |
| 3,660,207 | 5/1972 | Schrade et al. ................. | 100/161 X |

FOREIGN PATENTS OR APPLICATIONS

| | | | |
|---|---|---|---|
| 665,528 | 5/1929 | France............................... | 100/152 |
| 1,432,989 | 8/1969 | Germany........................... | 425/335 |
| 692,483 | 7/1965 | Italy................................... | 100/153 |

*Primary Examiner*—Peter Feldman
*Attorney, Agent, or Firm*—Spencer & Kaye

[57] ABSTRACT

An improved apparatus for the continuous compression of a material to form chipped wood, molded fiber board and similar plates or to vulcanize rubber conveyor belts or the like, which apparatus is of the type wherein the material is compressed between two spaced steel belts which are mounted on a plurality of rollers, at least some of which are pressure rollers, for movement therewith. The plurality of rollers are arranged in a row with adjacent ones thereof being laterally offset in height with respect to one or the other. The two belts alternately loop the individual rollers of the row with the lateral offset in height being such that the belts alternately loop the rollers by less than 180°.

9 Claims, 1 Drawing Figure

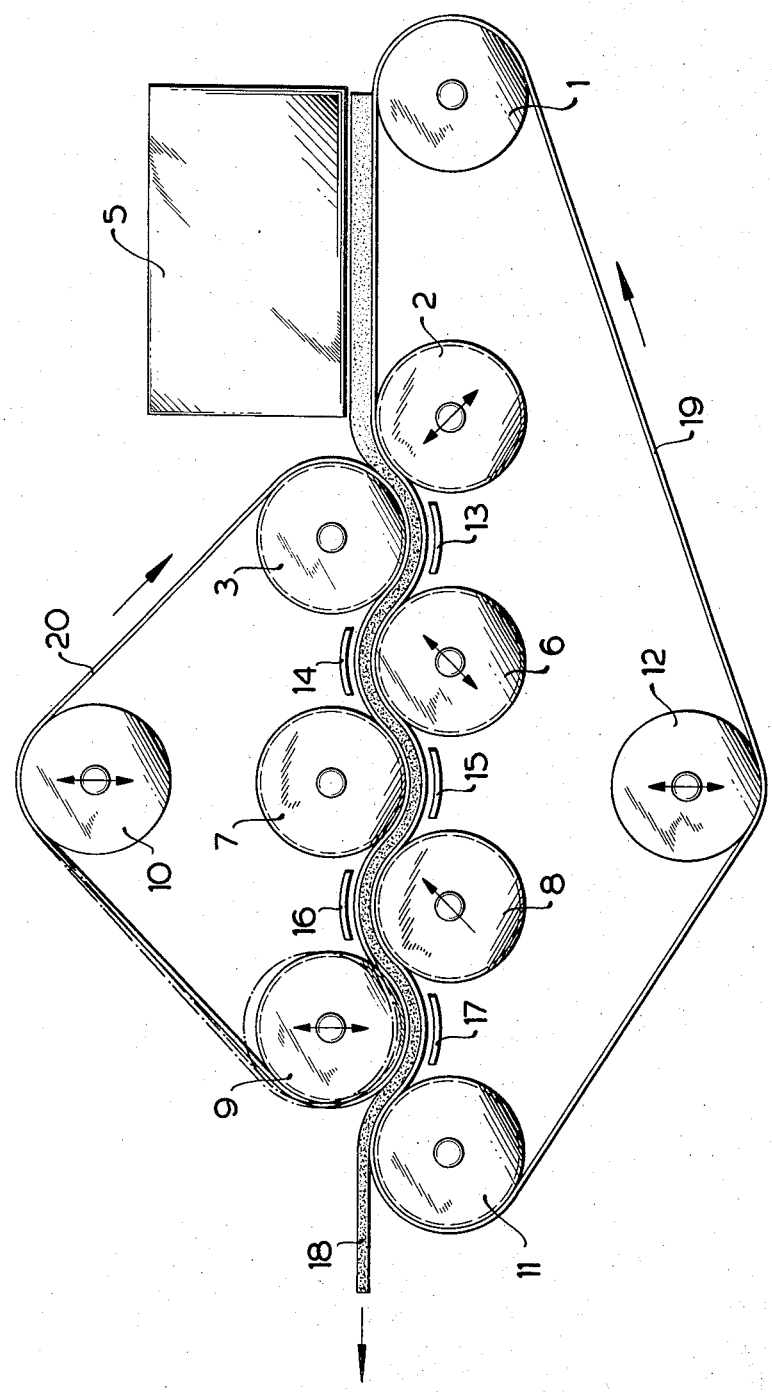

APPARATUS FOR EXERTING CONTINUOUS PRESSURE

BACKGROUND OF THE INVENTION

The present invention relates to an apparatus for exerting continuous pressure on, for example, a chipped wood plate, a molded fiber board plate or the like, and/or for the continuous vulcanization of rubber conveyor belts or the like.

Apparatuses for continuously exerting pressure, particularly for the continuous compression of chipped wood plates, are known. Such devices generally comprise two endless steel belts and three pairs of rollers arranged one behind the other, with the individual rollers of each pair of rollers being disposed one on top of the other. The lower one of the two endless steel belts is pulled forward somewhat by a further roller so that a collecting surface results on which the material to be pressed is deposited.

The material compressed between the two endless steel belts is then passed around a plurality of heated rollers with the rollers of the center pair of rollers, i.e., the rollers other than the rollers at the ends being enclosed, for example, up to about 300°. It is possible in this manner to continuously produce thin chipped wood plates.

The apparatuses according to the state of the art are, however, not capable of producing thick chipped wood plates because the long loop path of the individual rollers forces the plate being pressed to be greatly curved. While relatively thin chipped wood plates can withstand this curvature without damage, with thicker chipped wood plates, the curvature leads to damage in the continuously produced chipped wood plate.

In addition to the problems mentioned above when forming chipped wood plates problems also occur in the manufacture of rubber conveyor belts which have thus far been vulcanized in discontinuously operating presses, which presses must be considered to be extremely complicated and time consuming. Moreover the vulcanization machines have a large drum and a pressure belt between which the rubber conveyor belts are vulcanized. These machines, however, are extremely limited in the length of their pressure and heating zones.

SUMMARY OF THE INVENTION

The above-mentioned problems of the prior art are solved according to the present invention in that a plurality of rollers are provided in a row with adjacent rollers being laterally offset in height with respect to one another, a pair of spaced two endless steel belts, between which the material to be compressed is disposed, alternately the individual rollers of the row, and the lateral offset in height is such that the pair of belts alternately looping the rollers encloses same by less than 180°.

The problem on which the invention is based is further solved by the displaceable arrangement of those rollers around which the steel belts loop, which are used as the pressure rollers.

BRIEF DESCRIPTION OF THE DRAWING

The FIGURE is a schematic elevational view of a compressing apparatus according to the invention.

DESCRIPTION OF THE PREFERRED EMBODIMENT

Referring now to the drawing there is shown an apparatus according to the invention for the continuous production of a compressed plate or for the vulcanization of a conveyor belt. According to a basic feature of the invention the apparatus includes a row of rollers 2, 3, 6, 7, 8, 9, 11 with adjacent rollers being laterally offset in height with respect to one another. Mounted on the rollers 2, 6, 8 and 11, which as illustrated are in a horizontal row, for rotation therewith is an endless steel belt 19 which is maintained under tension by means of an additional adjustable roller 12. Similarly a second endless steel belt 20 is mounted on the rollers 3, 7 and 9, which as illustrated are situated in a horizontal row above the row of rollers 2, 6, 8 and 11. The steel belt 20 is maintained under tension by a further adjustable roller 10. The extent of the height offset between the rollers 3, 7 and 9 and the associated rollers 2, 6, 8 and 11 is such that the two belts 19 and 20 alternately loop the rollers of the row and enclose same by less than 180° as illustrated.

The material to be compressed is disposed between the two steel belts 19 and 20. In order to dispose same on the lower belt 19 from a supply source or spreader 5, the leading end of the belt 19 is extended by means of a further roller 1.

When the illustrated apparatus according to the present invention is to be used, for example, for the continuous production of thick chipped wood plates, each of rollers 2 and 6 are mounted so that they are obliquely adjustable in the direction of the adjacent roller 3, as indicated by the arrow contained therein, and serve as pressure rollers. Additionally roller 8 is mounted so that it is obliquely adjustable in the direction of roller 7. On the other hand roller 9, which is the last or exit roller associated with the upper belt 20 is mounted so that it is adjustable in the vertical direction. In order to supply heat to the belts 19 and 20 and thus to the material being compressed, rollers 2, 3, 6, 7, 8, 9 and 11 can be heated. In addition to the heating of the rollers infrared radiators 13 to 17 may be provided between the rollers and adjacent the belts 19 and 20.

The apparatus according to the invention operates as follows for the production of chipped wood plates: the spreader 5 spreads material to be compressed onto the endless steel belt 19 between rollers 1 and 2. The material is then carried by the belt 19 toward the belt 20. The endless steel belts 19 and 20 then cause the material to be subjected to a first compression in the roller gap between rollers 2 and 3. Since the glue adhesion of the individual chips depends upon a certain pressure and a certain temperature when a thick chipped wood plate is produced, all of the pressure rollers 2, 3, 6–9 and 11 are heated. After the material disposed between the two endless steel belts 19 and 20 has passed through the roller gap between the first two rollers i.e. rollers 2 and 3, it is moved by the two endless steel belts 19 and 20, while maintaining the pressure, to the second roller gap between rollers 3 and 6. Here the material is again compressed. This compression process is repeated between rollers 7 and 8. Roller 9 is adjustable in the vertical direction in order that the finished thick chipped wood plate 18 be subjected to a greatly reduced curvature before it leaves the machine.

It should be noted that it is also within the scope of the present invention to have other rollers connected in addition to the seven rollers shown arranged one behind the other in the illustrated embodiment. The number of rollers always depends on the discharge arrangement for the chipped wood plates to be produced. That is the pressure and heating zone can be extended in that an additional number of heated rollers are provided.

The required pressure to compress such chipped wood plates is produced in the individual roller gaps as a linear pressure and by the two endless steel belts which are kept under pressure by the tension rollers 10 and 12 as an areal pressure.

If the apparatus according to the present invention is to be used for the continuous vulcanization of rubber conveyor belts, rubber plates or rubber-coated plates, roller 2 must not then be used as a pressure roller since otherwise a rubber collar would be formed. The temperature of the individual rollers must of course also be adapted to the vulcanization process.

The apparatus according to the invention provides a number of significant advantages over the prior art devices.

The greatest advantage of the apparatus according to the present invention, when it is used for the production of chipped wood plates, is that thick chipped wood plates can also be continuously produced. This is made possible in particular because the chipped wood plate is curved only very slightly during the production process. In the apparatuses according to the state of the art, as mentioned above, the degree of wrapping around the individual rollers is substantially greater so that only relatively thin chipped wood plates, which can withstand such a curvature without damage, can be produced.

When a machine according to the present invention is used for vulcanization, it must be particularly emphasized that continuous vulcanization of a conveyor belt is now made possible.

Another advantage is that thick, steel cord reinforced rubber conveyor belts can be vulcanized because the conveyor belt is subjected to only a relatively slight curvature. It is thus assured that the embedded steel wires remain in the center of the rubber bedding.

It must also be noted that the output of the machine according to the present invention, when it is used for vulcanizing purposes, can be increased as desired by the subsequent connection of any number of offset, heated rollers. The vulcanization zone can thus be arbitrarily extended.

Compared to the discontinuously operating vulcanization presses which, according to the present state of the art, may have a working surface of up to 15 m, the machine according to the present invention is still substantially more economical, not only in its output but also in price.

It will be understood that the above description of the present invention is susceptible to various modifications, changes and adaptations, and the same are intended to be comprehended within the meaning and range of equivalents of the appended claims.

We claim:

1. In an apparatus for the continuous compression of a material forming chipped wood, molded fiber board and similar plates or to vulcanize rubber conveyor belts or the like, said apparatus including a pair of spaced steel belts which are mounted under tension on a plurality of heated rollers and between which the material to be compressed is disposed, the improvement wherein:

said plurality of rollers are arranged in a row with adjacent ones of said plurality of rollers being laterally offset in height with respect to one another, said pair of steel belts alternately loop the individual rollers of said plurality of rollers of said row, and said lateral offset in height being such that said pair of steel belts alternately loop said plurality of rollers by less than 180°.

2. The apparatus defined in claim 1 wherein at least some of said plurality of rollers are adjustable relative to the adjacent roller to serve as pressure rollers for the material passing therebetween.

3. The apparatus defined in claim 1 further including heating means disposed adjacent said pair of steel belts between said offset rollers.

4. The apparatus defined in claim 1 further including additional roller means associated with each of said steel belts for maintaining said belts under tension.

5. In an apparatus for the continuous compression of a material to form chipped wood, molded fiber board or similar plates or to vulcanize rubber conveyor belts and the like, wherein the material being compressed is disposed between two endless steel belts said apparatus including a first horizontal row of heated rollers having a first of said endless steel belts mounted thereof for rotation therewith, a second horizontal row of heated rollers positioned beneath said first row of rollers and having a second of said endless steel belts mounted thereon for rotation therewith, and means for maintaining each of said steel belts under tension, the improvement wherein the rollers of said first horizontal row of rollers are laterally offset with respect to the rollers of said second row of rollers with each roller of said first row of rollers partially extending between an adjacent pair of rollers of said second row of rollers, said rollers of said first row of rollers extending between adjacent rollers of said second row of rollers to an extent such that said first and second steel belts alternately loop rollers of said first and second rows by less than 180°.

6. The apparatus defined in claim 5 wherein at least some of said rollers of said second row of rollers are adjustable in an oblique linear direction toward the adjacent roller of said first row of rollers in order to provide for adjustment of the space there-between and hence the pressure exerted on the material between said steel belts.

7. The apparatus defined in claim 5 further including heating means disposed adjacent said steel belts between adjacent rollers of one of said rows of rollers for heating the material between said steel belts.

8. The apparatus defined in claim 6 wherein only the last roller of said first row of rollers is adjustable in the vertical direction the rotational axes of the remaining rollers of said first row being fixed.

9. The apparatus defined in claim 5 wherein said tensioning means includes a further roller associated with each of said steel belts.

* * * * *